(12) United States Patent
Oyaizu

(10) Patent No.: US 10,471,558 B2
(45) Date of Patent: Nov. 12, 2019

(54) ANTI-VIBRATION DEVICE MANUFACTURING METHOD

(71) Applicant: Toyo Tire & Rubber Co., Ltd., Itami-shi, Hyogo (JP)

(72) Inventor: Kei Oyaizu, Itami (JP)

(73) Assignee: TOYO TIRE CORPORATION, Itami-shi (JP)

( * ) Notice: Subject to any disclaimer, the term of this patent is extended or adjusted under 35 U.S.C. 154(b) by 79 days.

(21) Appl. No.: 15/850,544

(22) Filed: Dec. 21, 2017

(65) Prior Publication Data

US 2018/0178334 A1 Jun. 28, 2018

(30) Foreign Application Priority Data

Dec. 26, 2016 (JP) .................................. 2016-251638

(51) Int. Cl.
*B23P 19/02* (2006.01)
*F16F 1/37* (2006.01)
(Continued)

(52) U.S. Cl.
CPC .......... *B23P 19/027* (2013.01); *F16F 1/3732* (2013.01); *F16F 15/027* (2013.01); *F16F 1/3842* (2013.01); *Y10T 29/49877* (2015.01)

(58) Field of Classification Search
CPC ..... B23P 19/027; F16F 1/3732; F16F 1/3842; F16F 15/027; F16F 1/38; Y10T 29/49877; Y10T 29/49879; Y10T 29/49146
See application file for complete search history.

(56) References Cited

U.S. PATENT DOCUMENTS 2,367,832 A * 1/1945 Riesing ..................... F16F 1/38
384/215
3,762,747 A * 10/1973 Griffen ................... F16C 11/04
403/225
(Continued)

FOREIGN PATENT DOCUMENTS

CN 204658278 U 9/2015
JP 2001-38543 A 2/2001
(Continued)

OTHER PUBLICATIONS

Fujimoto et al.; Vibration Control Bush Manufacturing Device; JP-2001038543; EPO English Machine Translation; Jul. 7, 2019, pp. 1-8.*
(Continued)

*Primary Examiner* — Bayan Salone
(74) *Attorney, Agent, or Firm* — Westerman, Hattori, Daniels & Adrian, LLP

(57) ABSTRACT

Provided is an anti-vibration device manufacturing method of press-inserting an anti-vibration bush having a rubber elastic body famed on an outer periphery of a cylindrical body into an attachment hole formed in a press-insertion object, the anti-vibration device manufacturing method including: a press-inserting step of moving the anti-vibration bush in a first direction to be press-inserted into the attachment hole; a returning step of moving the anti-vibration bush press-inserted into the attachment hole in a second direction opposite to the first direction; and a strain relaxing step of relaxing a strain of the rubber elastic body by stopping the anti-vibration bush while regulating the movement of the anti-vibration bush between the press-inserting step and the returning step.

10 Claims, 11 Drawing Sheets

(51) Int. Cl.
*F16F 1/38* (2006.01)
*F16F 15/02* (2006.01)
*B23P 19/027* (2006.01)
*F16F 1/373* (2006.01)
*F16F 15/027* (2006.01)

(56) References Cited

U.S. PATENT DOCUMENTS

| | | | | |
|---|---|---|---|---|
| 3,904,300 | A | * | 9/1975 | Hetmann ............... F16C 27/063 403/203 |
| 4,282,768 | A | * | 8/1981 | Osborn .................. B60K 20/02 248/603 |
| 5,902,050 | A | * | 5/1999 | Balczun ............... F16C 11/0614 267/141 |
| 6,854,723 | B2 | * | 2/2005 | Ogawa .................... F16F 1/371 267/140.12 |
| 2002/0070480 | A1 | * | 6/2002 | Watanabe ............... B29C 70/84 264/262 |
| 2006/0214341 | A1 | * | 9/2006 | Sugiura ................. F16F 1/3842 267/293 |

FOREIGN PATENT DOCUMENTS

| | | | |
|---|---|---|---|
| JP | 2001038543 A | * | 2/2001 |
| JP | 2002-263967 A | | 9/2002 |

OTHER PUBLICATIONS

Office Action dated Jul. 30, 2019, issued in counterpart CN Application No. 201711311174.X, with English translation (11 pages).

* cited by examiner

ANTI-VIBRATION DEVICE MANUFACTURING METHOD

BACKGROUND OF THE INVENTION

Field of the Invention

The present invention relates to a method of manufacturing an anti-vibration device by press-inserting an anti-vibration bush having a rubber elastic body formed on an outer periphery of a cylindrical body into an attachment hole famed in a press-insertion object.

Description of the Related Art

JP-A-2001-38543 discloses a method of manufacturing an anti-vibration device such as a torque rod by press-inserting an anti-vibration bush having a rubber elastic body formed on an outer periphery of a cylindrical body into an attachment hole formed in a press-insertion object.

Specifically, a press-inserting step of moving the anti-vibration bush downward from the upper side of the press-insertion object to be press-inserted into the attachment hole formed in the press-insertion object is performed. In the press-inserting step, the anti-vibration bush is press-inserted to a position where a lower end of the rubber elastic body formed in the anti-vibration bush protrudes downward from the press-insertion object. Subsequently, a returning step of pressing the anti-vibration bush upward so that an upper end of the rubber elastic body protrudes from the press-insertion object is performed and thus the attachment of the anti-vibration bush to the press-insertion object is completed.

However, when the anti-vibration bush is press-inserted into the attachment hole of the press-insertion object as described above, the anti-vibration bush is inclined in the attachment hole after the anti-vibration bush is separated from a press-insertion device and thus a defective product is obtained.

SUMMARY OF THE INVENTION

The invention is made in view of the above-described problems and an object of the invention is to provide an anti-vibration device manufacturing method capable of preventing a defective product manufactured when an anti-vibration bush is inclined inside an attachment hole after the press-inserting of the anti-vibration bush is completed.

The inventor has found that such a defective product is obtained by a strain generated in the rubber elastic body of the anti-vibration bush in the press-inserting step and has contrived the invention. That is, an anti-vibration device manufacturing method of the invention is an anti-vibration device manufacturing method of press-inserting an anti-vibration bush having a rubber elastic body formed on an outer periphery of a cylindrical body into an attachment hole formed in a press-insertion object, the anti-vibration device manufacturing method including: a press-inserting step of moving the anti-vibration bush in a first direction from an initial position separated from the press-insertion object to be press-inserted into the attachment hole; a returning step of moving the anti-vibration bush press-inserted into the attachment hole in a second direction opposite to the first direction; and a strain relaxing step of relaxing a strain of the rubber elastic body by stopping the anti-vibration bush while regulating the movement of the anti-vibration bush between the press-inserting step and the returning step.

DETAILED DESCRIPTION OF THE INVENTION

Hereinafter, an embodiment of the invention will be described with reference to the drawings.

Figure 1:
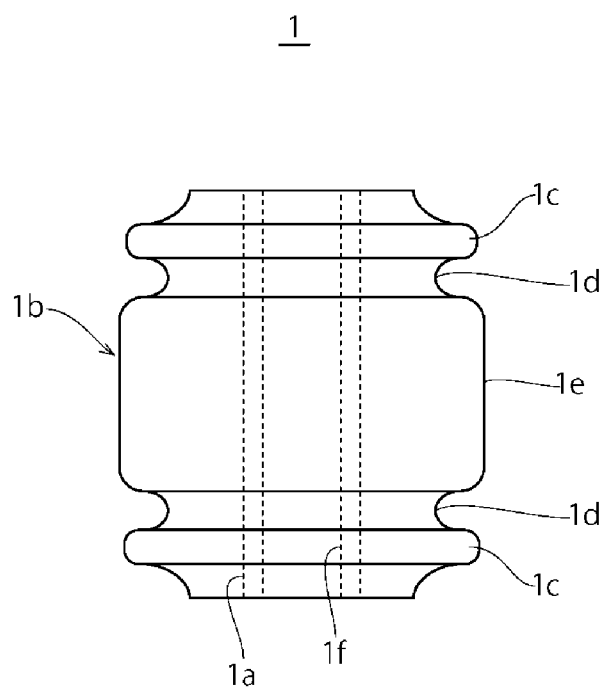
FIG. 1 is a side view illustrating an anti-vibration bush used in an anti-vibration device manufacturing method according to an embodiment of the invention.
Figure 2:
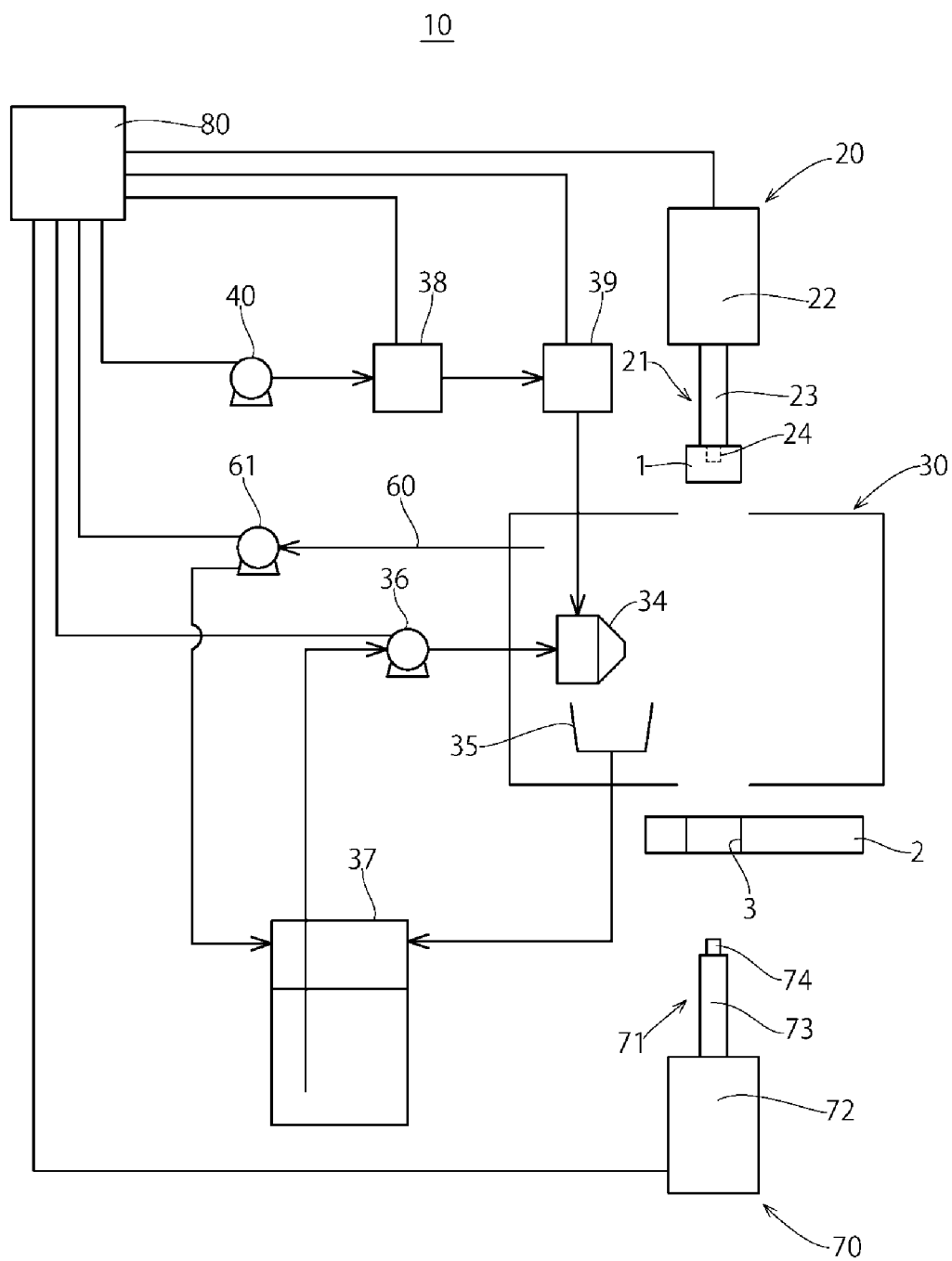
FIG. 2 is a block diagram illustrating an overall configuration of a device that performs the anti-vibration device manufacturing method according to the embodiment of the invention.
Figure 3:
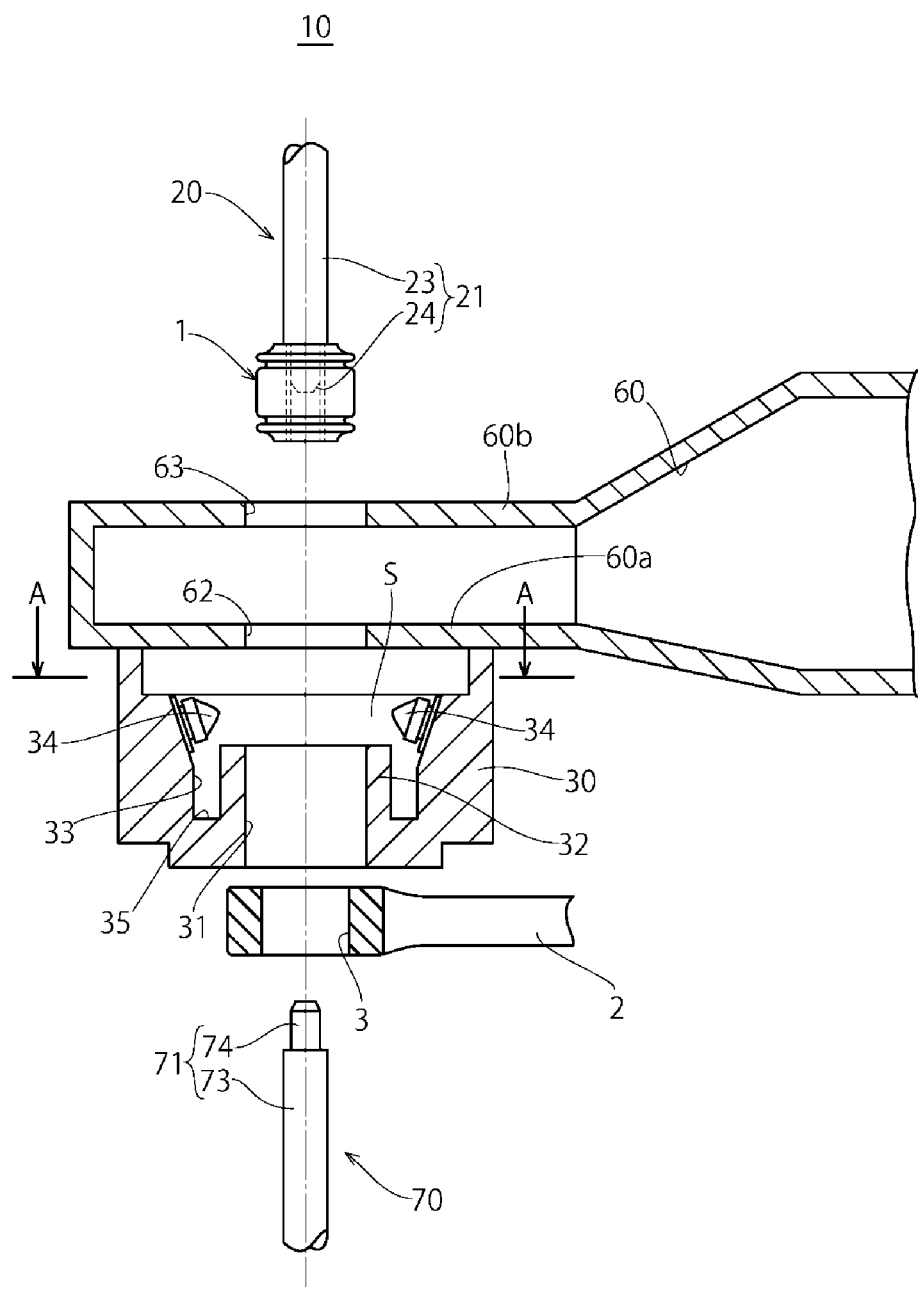
FIG. 3 is a schematic configuration diagram illustrating a main part of the device of FIG. 2.

An anti-vibration device manufacturing method of the embodiment is a method of manufacturing an anti-vibration device such as a torque rod by press-inserting an anti-vibration bush 1 illustrated in FIG. 1 into an attachment hole 3 formed in a press-insertion object and is performed by a bush press-insertion device 10 exemplified in FIGS. 2 and 3.

The anti-vibration bush 1 includes, as illustrated in FIG. 1, a metallic cylindrical body 1a and a rubber elastic body 1b bonded to an outer peripheral surface of the cylindrical body 1a in a vulcanized state.

The rubber elastic body 1b is famed in a cylindrical shape which coaxially surrounds the cylindrical body 1a with a hollow portion 1f. Both ends of the rubber elastic body 1b in the axial direction are provided with a pair of flange portions 1c which protrude outward in the radial direction and a pair of reduced diameter portions 1d and 1d are formed in an annular shape at the inside of the pair of flange portions 1c and 1c to be depressed inward in the radial direction. A straight portion 1e having an outer surface parallel to the axial direction is formed in an area interposed between the pair of reduced diameter portions 1d and 1d in the axial direction. The pair of reduced diameter portions 1d and 1d are famed to have a diameter smaller than the straight portion 1e.

As illustrated in FIGS. 2 and 3, the bush press-insertion device 10 includes a press-insertion portion 20 which moves the anti-vibration bush 1 between a press-insertion object 2 and an initial position separated from the press-insertion object 2, a casing 30 which is provided between the initial position and the press-insertion object 2, a nozzle 34 which sprays a lubricant into the casing 30, an exhaust duct 60 which is connected to the casing 30, and a returning portion 70 which is provided at the opposite side to the press-insertion portion 20 with the press-insertion object 2 interposed therebetween.

The press-insertion portion 20 includes a press-insertion rod 21 in which the anti-vibration bush 1 is attached to one end (in this example, a lower end) and a driving mechanism 22 which is connected to the other end (in this example, an upper end) of the press-insertion rod 21. In this example, the press-insertion portion 20 is disposed above the press-insertion object 2.

The press-insertion rod 21 includes a base portion 23 and an insertion portion 24 provided at a lower end of the base portion 23 and having a diameter smaller than that of the base portion 23 and the insertion portion 24 is inserted into the hollow portion $1f$ of the cylindrical body $1a$ of the anti-vibration bush 1. The insertion portion 24 is provided with a ball plunger (not illustrated) and the ball plunger is locked to the cylindrical body $1a$ of the anti-vibration bush 1 inserted into the insertion portion 24. Accordingly, the anti-vibration bush 1 is fixed to the insertion portion 24.

The driving mechanism 22 is configured as, for example, an actuator such as a linear servomotor. The driving mechanism 22 applies a thrust to the anti-vibration bush 1 attached to the insertion portion 24 through the press-insertion rod 21. Accordingly, the driving mechanism 22 moves the anti-vibration bush 1 downward and toward the press-insertion object 2 to be press-inserted into the attachment hole 3 of the press-insertion object 2.

Figure 4:
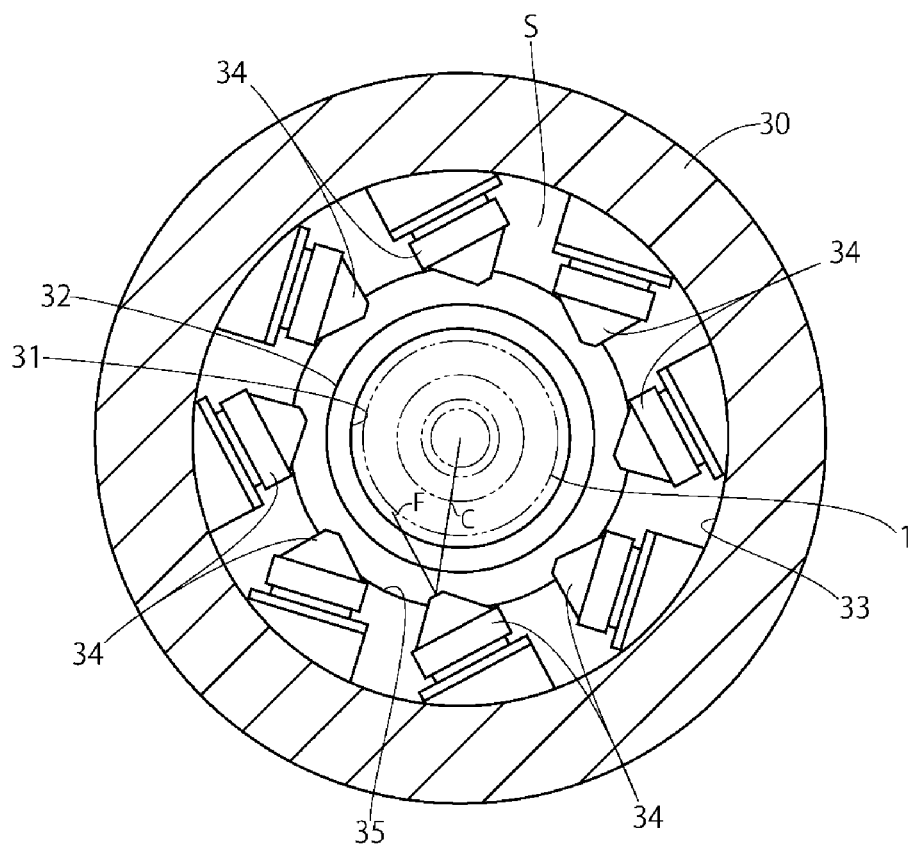
FIG. 4 is a cross-sectional view taken along a line A-A of FIG. 3.

As illustrated in FIGS. 3 and 4, the casing 30 is disposed below the press-insertion portion 20. The anti-vibration bush 1 which moves down from the initial position toward the press-insertion object 2 passes through a spray chamber S formed inside the casing 30.

A bottom portion of the casing 30 is provided with a through-hole 31 which penetrates the bottom portion in the vertical direction along the movement track of the anti-vibration bush 1. The peripheral edge of the through-hole 31 is provided with a cylindrical portion 32 which protrudes upward and toward the spray chamber S. The through-hole 31 which is formed at the inside of the cylindrical portion 32 has an inner diameter larger than the outer diameter of the anti-vibration bush 1. The anti-vibration bush 1 passing through the spray chamber S moves toward the lower side of the spray chamber S while passing through the through-hole 31.

An inner peripheral surface 33 of the spray chamber S is provided with the nozzle 34 which sprays the lubricant into the spray chamber S. The nozzle 34 is located above an upper end of the cylindrical portion 32 and is provided at a plurality of positions at intervals in the circumferential direction to surround the cylindrical portion 32.

A lubricant spraying direction F of each nozzle 34 is inclined at a predetermined angle to approach the tangential direction of the outer peripheral surface of the anti-vibration bush 1 in the radial direction C of the anti-vibration bush 1 passing through the spray chamber S (see FIG. 4) and is inclined backward (upward) in the movement direction with respect to a plane (a horizontal plane) orthogonal to the movement direction of the anti-vibration bush 1 (see FIG. 3).

The lubricant inside the tank 37 is supplied to the plurality of nozzles 34 provided in the spray chamber S by a supply pump 36 as illustrated in FIG. 2. Further, compressed air is supplied from a compressor 40 to the plurality of nozzles 34 through a regulator 38 and an opening/closing valve 39. Then, the lubricant is sprayed from the nozzle 34 when the opening/closing valve 39 is opened and the spraying of the lubricant is stopped when the opening/closing valve 39 is closed.

Further, a bottom portion of the casing 30 is provided with a liquid reservoir 35 which is formed between the cylindrical portion 32 and the inner peripheral surface 33 of the spray chamber S so that the lubricant sprayed from the nozzle 34 is accumulated therein. As illustrated in FIG. 2, the liquid reservoir 35 is connected to the tank 37 which stores the lubricant by a pipe. The lubricant accumulated in the liquid reservoir 35 passes through the pipe to be returned to the tank 37.

One end of the exhaust duct 60 is connected to an upper surface of the casing 30 and the other end thereof is connected to an exhaust pump 61. Specifically, one end of the exhaust duct 60 is provided with an exhaust hole 62 which is formed by penetrating at a lower surface wall $60a$ defining the lower portion of the exhaust duct 60 to have an inner diameter larger than the outer diameter of the anti-vibration bush 1. The exhaust duct 60 communicates with the spray chamber S formed inside the casing 30 through the exhaust hole 62. Further, one end of the exhaust duct 60 is provided with an introduction hole 63 which is formed by penetrating at an upper surface wall $60b$ defining the upper portion of the duct to have an inner diameter larger than the outer diameter of the anti-vibration bush 1. The exhaust hole 62 and the introduction hole 63 are provided along the movement track of the anti-vibration bush 1 and are disposed coaxially with the through-hole 31 of the casing 30.

The exhaust pump 61 sucks air of the spray chamber S from the exhaust hole 62 provided in the lower surface wall $60a$ and discharges the air to the outside through the exhaust duct 60. Further, the lubricant which is sucked by the exhaust pump 61 along with the air of the spray chamber S passes through the pipe to be returned to the tank 37.

In the returning portion 70, a direction in which a thrust is applied to the anti-vibration bush 1 is a direction (an upward direction) opposite to the press-insertion portion 20, but a basic configuration is the same as the configuration of the press-insertion portion 20. The returning portion includes a returning rod 71 and a driving mechanism 72 connected to the lower end of the returning rod 71.

The returning rod 71 includes a base portion 73 and an insertion portion 74 provided at an upper end of the base portion 73 and having a diameter smaller than that of the base portion 73. The returning rod 71 is disposed coaxially with the press-insertion rod 21 of the press-insertion portion 20, the exhaust hole 62 and the introduction hole 63 provided in the exhaust duct 60, and the through-hole 31 provided in the casing 30. The insertion portion 74 which is provided at an upper end of the returning rod 71 is inserted into the hollow portion $1f$ of the cylindrical body $1a$ of the anti-vibration bush 1 press-inserted into the attachment hole 3 of the press-insertion object 2 from below.

The driving mechanism 72 is configured as, for example, an actuator such as a linear servomotor and moves the anti-vibration bush 1 press-inserted into the attachment hole 3 of the press-insertion object 2 upward by applying a thrust to the anti-vibration bush 1 through the returning rod 71.

In the bush press-insertion device 10 with such a configuration, a control unit 80 (see FIG. 2) controls the operations of the driving mechanism 22 of the press-insertion portion 20, the supply pump 36, the opening/closing valve 39, the compressor 40, the exhaust pump 61, and the driving mechanism 72 of the returning portion 70. Accordingly, the bush press-insertion device 10 press-inserts the anti-vibration bush 1 attached to the press-insertion rod 21 of the press-insertion portion 20 into the attachment hole 3 of the press-insertion object 2 disposed between the casing 30 and the returning portion 70 and attaches the anti-vibration bush 1 to a position (hereinafter, this position will be referred to as an attachment position) in which the upper and lower flange portions 1c and 1c of the anti-vibration bush 1 contact the end surface of the attachment hole 3 of the press-insertion object 2 in the axial direction.

Figure 5A:
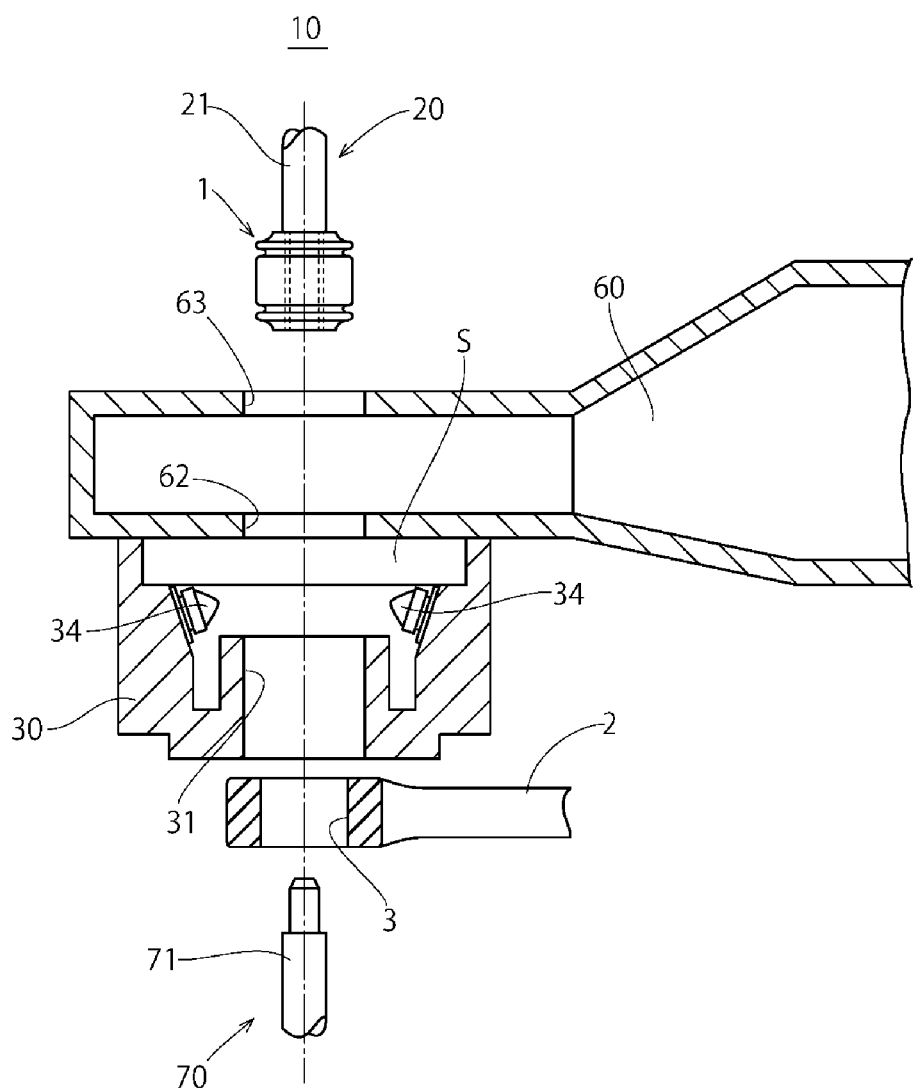
FIG. 5A is a schematic cross-sectional view illustrating an operation in a coating step of the device of FIG. 2.

Specifically, as illustrated in FIG. 5A, the insertion portion 24 of the press-insertion rod 21 is inserted into the hollow portion 1f of the anti-vibration bush 1 so that the anti-vibration bush 1 is attached to the press-insertion portion 20 and the anti-vibration bush 1 is disposed at the initial position. Further, the press-insertion object 2 is disposed between the casing 30 and the returning portion 70 so that the axis center of the attachment hole 3 of the press-insertion object 2 is disposed coaxially with the press-insertion rod 21, the exhaust hole 62, the introduction hole 63, the through-hole 31, and the returning rod 71. Additionally, the press-insertion object 2 is immovably fixed in a press-inserting step or a returning step to be described later.

After the anti-vibration bush 1 and the press-insertion object 2 are attached to the bush press-insertion device 10 as in FIG. 5A, the control unit 80 controls the driving mechanism 22 so that the press-insertion rod 21 moves downward and toward the press-insertion object 2. Accordingly, the anti-vibration bush 1 which is attached to the press-insertion rod 21 enters the exhaust duct 60 from the introduction hole 63, passes through the exhaust duct 60, and advances to the spray chamber S inside the casing 30 from the exhaust hole 62. Additionally, in the embodiment, the exhaust pump 61 is continuously operated to suck the air of the spray chamber S from the exhaust hole 62 and to discharge the air to the outside during the operation of the bush press-insertion device 10.

Figure 5B:
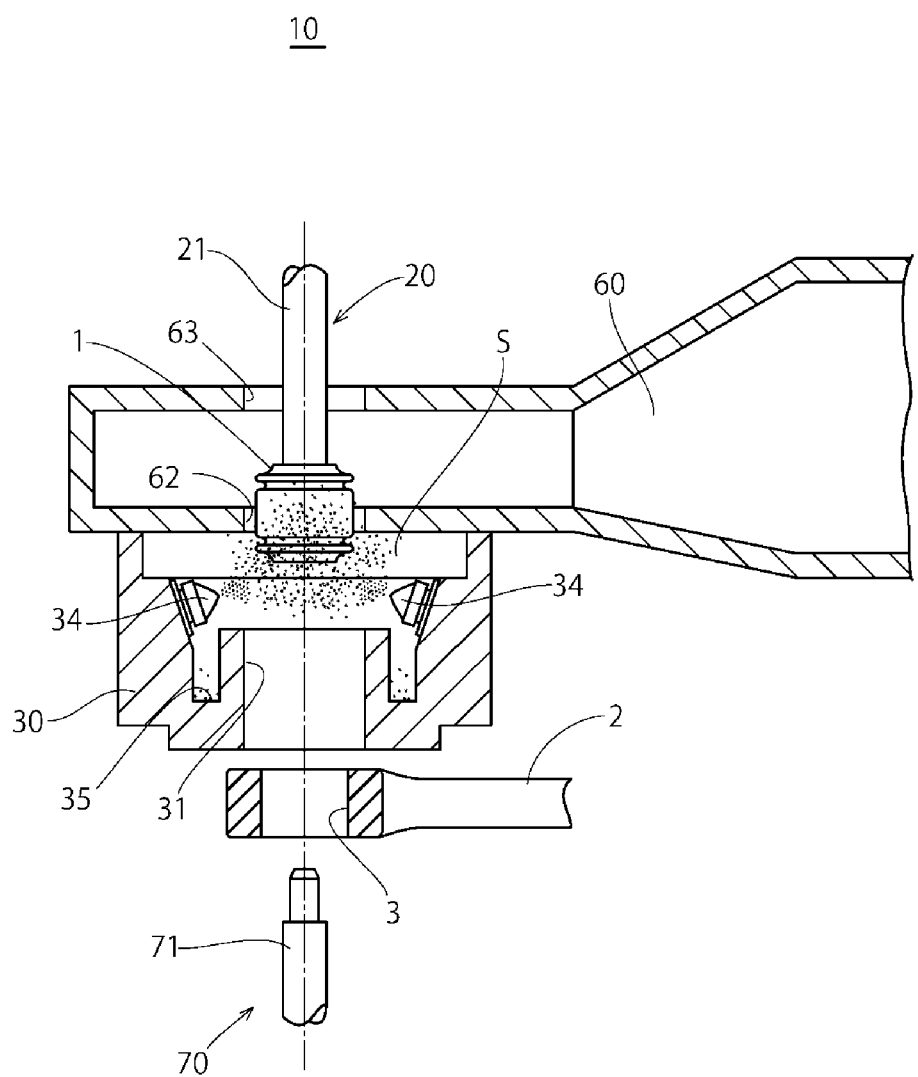
FIG. 5B is a schematic cross-sectional view illustrating the operation in the coating step of the device of FIG. 2.

At that time, as illustrated in FIG. 5B, the flange portion 1c on the side (that is, on the lower side) of the returning portion 70 of the anti-vibration bush 1 passes through the exhaust hole 62 and enters the spray chamber S, but in a state where the straight portion 1e is located at the exhaust hole 62 to block the exhaust hole 62, the control unit 80 opens the opening/closing valve 39 to start a coating step of spraying the lubricant from the nozzle 34 and coating the lubricant onto the rubber elastic body 1b of the anti-vibration bush 1. Since the nozzle 34 is provided at the casing 30 to be inclined upward with respect to a horizontal plane, the lubricant sprayed from the nozzle 34 is sprayed to the lower flange portion 1c entering the spray chamber S from below.

Further, since the nozzle 34 starts to spray the lubricant in a state where the straight portion 1e is located at the exhaust hole 62 to block the exhaust hole 62, the lubricant is not easily discharged to the outside from the exhaust hole 62 immediately after the spraying has started and thus the mist-like lubricant can be filled into the spray chamber S in short time. For that reason, since the anti-vibration bush 1 first contacts the press-insertion object 2 when the anti-vibration bush 1 is press-inserted into the attachment hole 3 of the press-insertion object 2, the lubricant can be reliably coated onto the lower flange portion 1c which can be most likely to be caught (damaged due to rubbing).

Figure 5C:
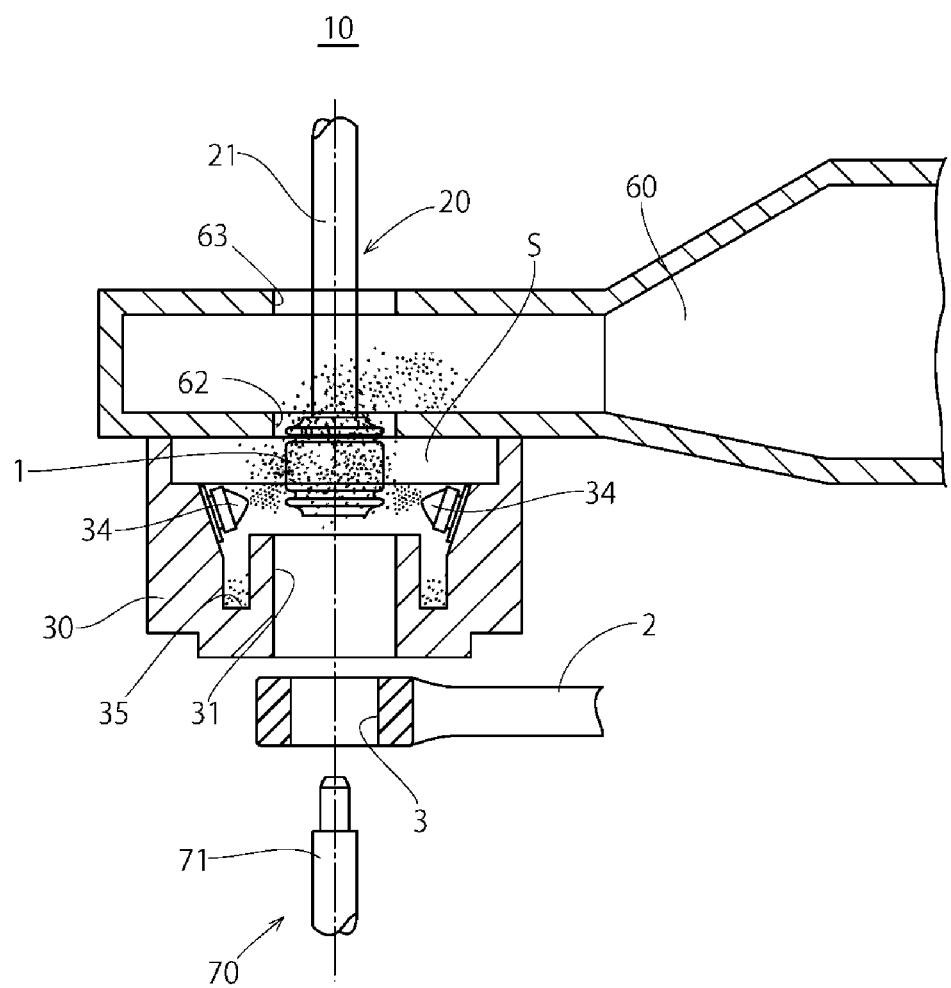
FIG. 5C is a schematic cross-sectional view illustrating the operation in the coating step of the device of FIG. 2.
Figure 5D:
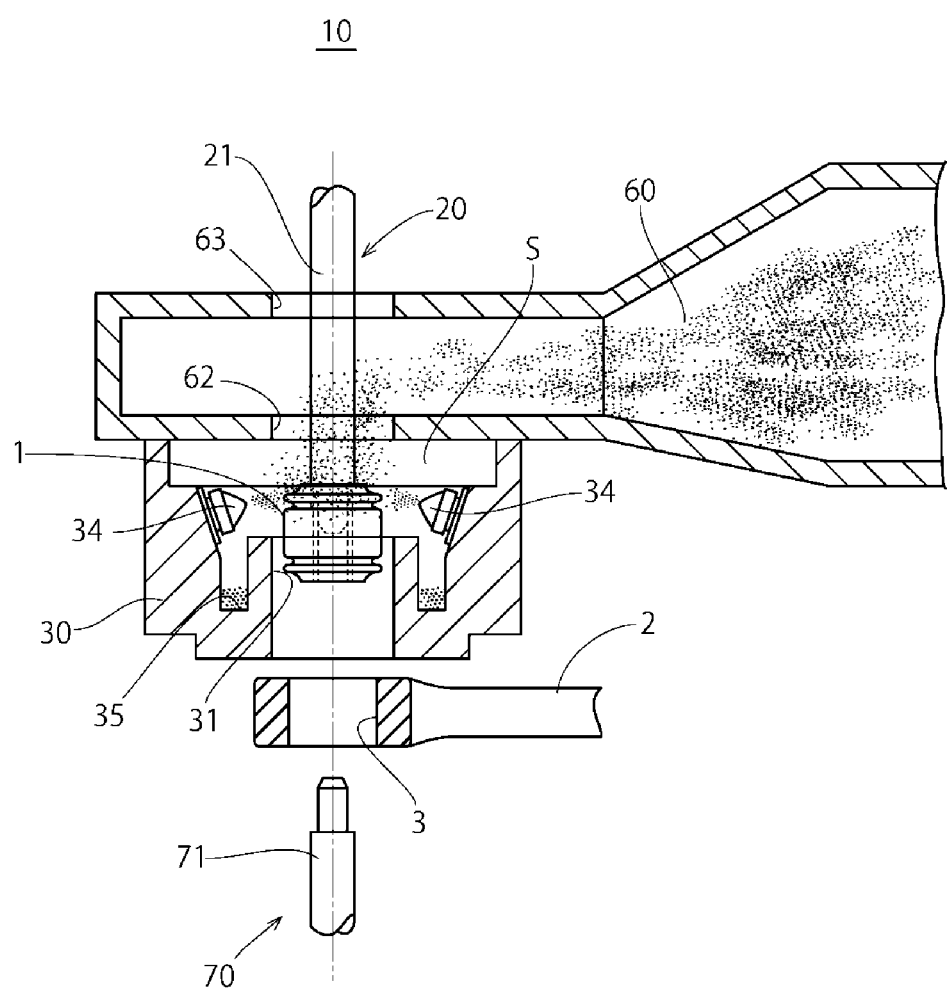
FIG. 5D is a schematic cross-sectional view illustrating the operation in the coating step of the device of FIG. 2.

Then, when the anti-vibration bush 1 is further moved downward from the state shown in FIG. 5B, the lubricant is sprayed from the nozzle 34 while the anti-vibration bush 1 passes through the spray chamber S as illustrated in FIGS. 5C and 5D.

The lubricant which is not coated onto the anti-vibration bush 1 in the lubricant sprayed from the nozzle 34 inside the spray chamber S passes through the exhaust hole 62 to be discharged to the outside of the casing 30 from the exhaust duct 60 or is accumulated in the liquid reservoir 35 to be discharged to the tank 37 through the pipe.

Figure 6:
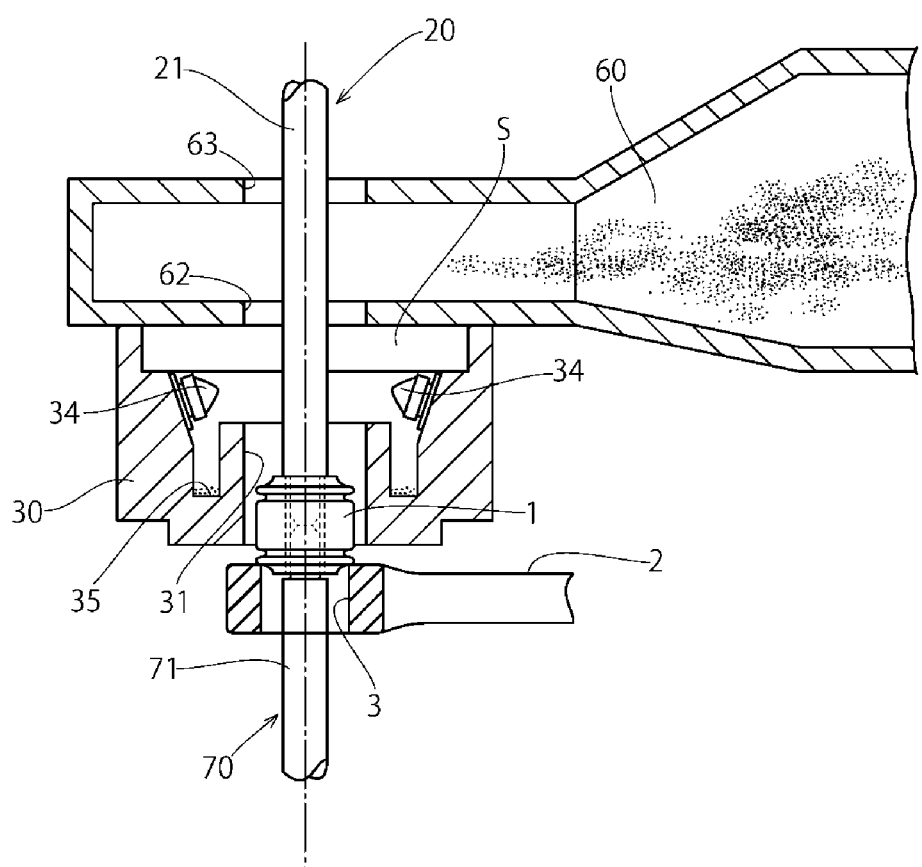
FIG. 6 is a schematic cross-sectional view illustrating the operation of the device of FIG. 2.

Then, the anti-vibration bush 1 coated with the lubricant in the spray chamber S moves in the through-hole 31 provided at the inside of the cylindrical portion 32. When the anti-vibration bush 1 moves in the through-hole 31, the control unit 80 closes the opening/closing valve 39 to stop the spraying of the lubricant from the nozzle 34 and to end the coating step. Further, the control unit 80 controls the driving mechanism 72 so that the returning rod 71 moves upward and the insertion portion 74 of the returning rod 71 is inserted into the hollow portion 1f of the anti-vibration bush 1 above the press-insertion object 2 from below (see FIG. 6).

Figure 7:
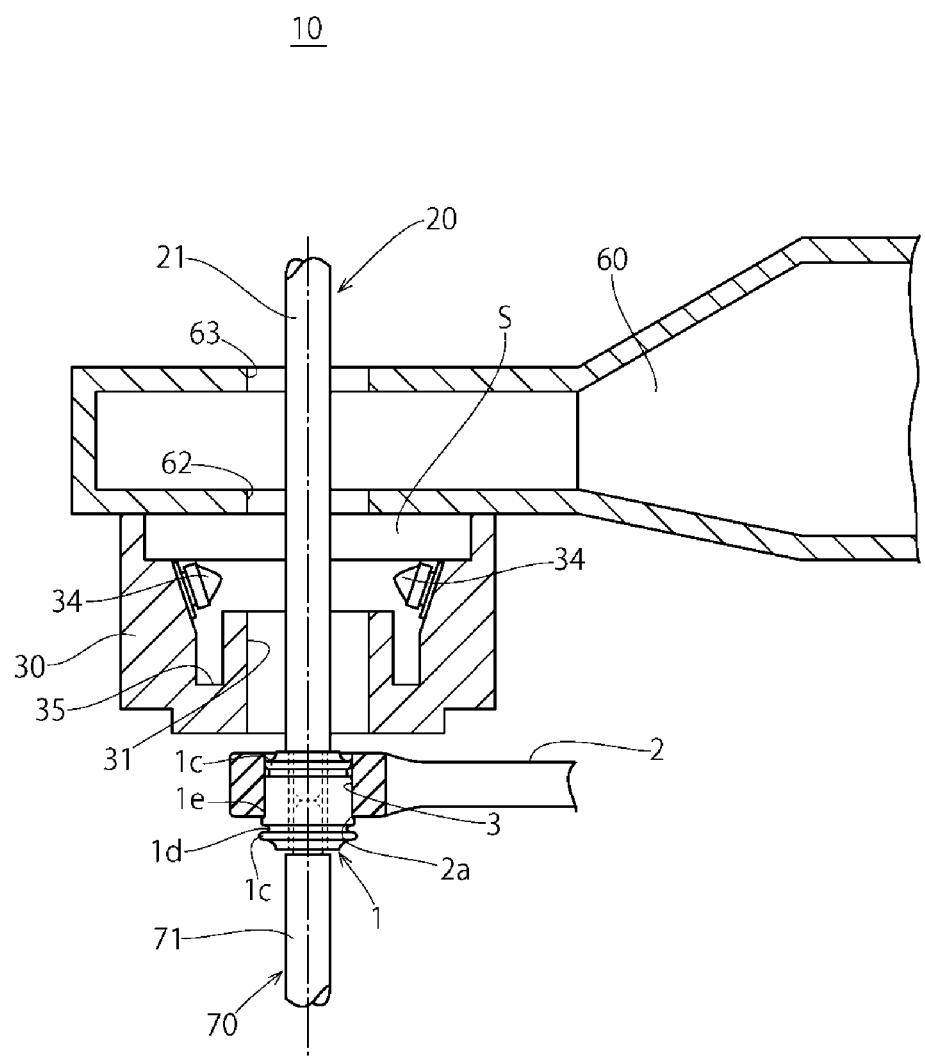
FIG. 7 is a schematic cross-sectional view illustrating the operation of the device of FIG. 2.

Subsequently, the control unit 80 performs a press-inserting step of moving the press-insertion rod 21 downward so that the anti-vibration bush 1 is press-inserted into the attachment hole 3 of the press-insertion object 2 and moves the returning rod 71 downward in synchronization with the press-insertion rod 21. In the press-inserting step, the lower reduced diameter portion 1d of the anti-vibration bush 1 protrudes downward from the press-insertion object 2 beyond the attachment position as illustrated in FIG. 7 and the anti-vibration bush 1 moves downward to a position (hereinafter, this position will be referred to as a first position) where the lower end 2a of the press-insertion object 2 holds the straight portion 1e of the anti-vibration bush 1.

Then, when the press-inserting step of the anti-vibration bush 1 ends, the control unit 80 performs a strain relaxing step of stopping the press-insertion rod 21 and the returning rod 71 before a returning step to be described below is performed. In the strain relaxing step, the anti-vibration bush 1 is stopped at the first position for a predetermined time in a state where the insertion portion 24 of the press-insertion rod 21 and the insertion portion 74 of the returning rod 71 are inserted into the hollow portion 1f of the anti-vibration bush 1 to regulate the movement of the anti-vibration bush 1. In such a strain relaxing step, a strain generated in the rubber elastic body 1b of the anti-vibration bush 1 in the press-inserting step is relaxed by the restoring force of the rubber elastic body 1b while the anti-vibration bush 1 is stopped. In addition, a time for performing the strain relaxing step, that is, a time for stopping the anti-vibration bush 1 at the first position can be set to, for example, 1 to 5 seconds.

Figure 8:
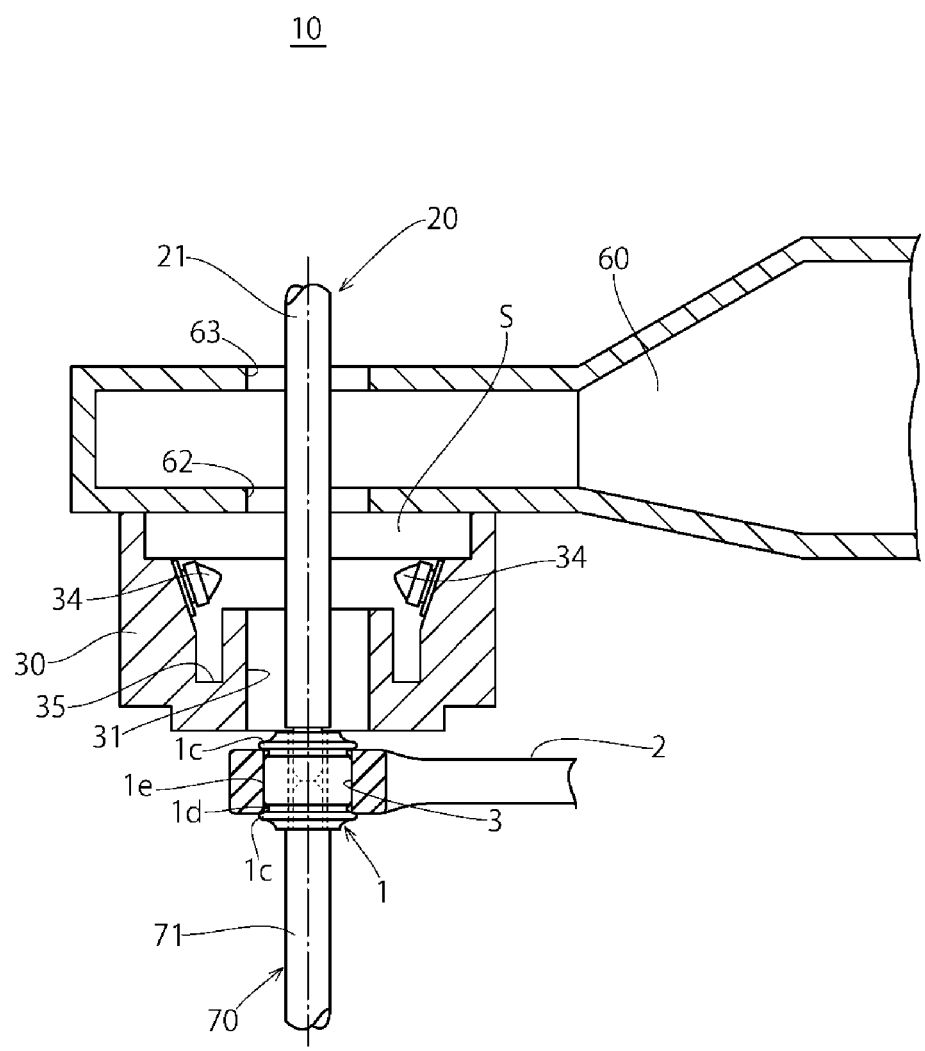
FIG. 8 is a schematic cross-sectional view illustrating the operation of the device of FIG. 2.

Then, when the strain relaxing step ends, the control unit 80 performs the returning step of moving the returning rod 71 upward and moving the anti-vibration bush 1 press-inserted into the attachment hole 3 of the press-insertion object 2 to the first position upward to the attachment position (see FIG. 8).

Then, when the anti-vibration bush 1 is attached to the attachment position and the returning step is completed, the control unit 80 moves the press-insertion rod 21 upward and moves the returning rod 71 downward and the manufacturing of the anti-vibration device ends.

In the bush press-insertion device 10 of the embodiment, since the lubricant is sprayed from the nozzle 34 so that the lubricant is coated onto the anti-vibration bush 1 while the anti-vibration bush 1 passes through the spray chamber S formed inside the casing 30, the sprayed lubricant is hardly scattered to the outside of the casing 30 and thus degradation in working environment can be suppressed. Further, since the lubricant is coated onto the anti-vibration bush 1, the lubricant coated during the press-insertion operation is not scraped off. Accordingly, since the anti-vibration bush can be press-inserted into the attachment hole 3 while the lubricant is coated thereon, it is possible to suppress the anti-vibration bush from being caught.

Further, the casing 30 is disposed between the press-insertion object 2 and the initial position where the anti-vibration bush 1 is attached to the press-insertion rod 21 and the anti-vibration bush 1 immediately after passing through the spray chamber S in the casing 30 can be press-inserted into the attachment hole 3 of the press-insertion object 2. For that reason, the anti-vibration bush 1 can be press-inserted into the attachment hole 3 of the press-insertion object 2 before the lubricant coated on the anti-vibration bush 1 drips down.

In the embodiment, the lubricant spraying direction F of the nozzle 34 is inclined to approach the tangential direction of the anti-vibration bush 1 in the radial direction C of the anti-vibration bush passing through the casing 30. For that reason, it is possible to increase a distance along the lubricant spraying direction F from the nozzle 34 to the anti-vibration bush 1 even when the volume inside the casing 30 is set to be small. For that reason, since the lubricant sprayed from the nozzle 34 inside the narrow spray chamber S is easily dispersed, it is possible to coat the lubricant onto the entire anti-vibration bush 1 while suppressing the lubricant spraying amount.

Further, in the embodiment, since the lubricant spraying direction F of the nozzle 34 is inclined upward with respect to the horizontal plane orthogonal to the movement direction of the anti-vibration bush 1, the lubricant sprayed from the nozzle 34 can be sprayed from the lower side of the flange portion 1c. For that reason, since it is possible to reliably coat the lubricant onto the lower surface of the straight portion 1e or the lower surface of the flange portion 1c which can be easily caught at the time of press-inserting the anti-vibration bush 1 into the attachment hole 3 of the press-insertion object 2, it is possible to further reliably prevent the anti-vibration bush from being caught.

In the embodiment, the casing 30 is connected to the exhaust duct 60 and the lubricant sprayed into the casing 30 can be discharged to the outside of the casing 30 through the exhaust duct 60. For that reason, the lubricant is further hardly scattered. Particularly, in the embodiment, the lubricant is sprayed from the plurality of nozzles 34 provided at an interval in the circumferential direction in a direction inclined to approach the tangential direction of the anti-vibration bush 1 with respect to the radial direction C of the anti-vibration bush 1 and inclined upward with respect to the horizontal plane. In addition, the exhaust hole 62 communicating the exhaust duct 60 with the spray chamber S inside the casing 30 is disposed above the casing 30. For that reason, a flow which rises in a swirling state is generated inside the casing 30 by the lubricant sprayed from the plurality of nozzles 34 and the lubricant which is not coated onto the anti-vibration bush 1 is more easily discharged from the exhaust hole 62 to the outside through the exhaust duct 60.

In the embodiment, since the liquid reservoir 35 is provided to receive the lubricant sprayed into the casing 30, it is possible to suppress the lubricant which is not coated onto the anti-vibration bush 1 from flowing out of the through-hole 31 provided in the casing 30.

In the embodiment, the nozzle 34 starts to spray the lubricant in a state where the straight portion 1e is located at the exhaust hole 62 to block the exhaust hole 62. For that reason, the lubricant cannot be easily discharged to the outside from the exhaust hole 62 immediately after the spraying has started and the mist-like lubricant can be filled into the spray chamber S in short time. For that reason, since the anti-vibration bush 1 first contacts the press-insertion object 2 when the anti-vibration bush 1 is press-inserted into the attachment hole 3 of the press-insertion object 2, the lubricant can be reliably coated onto the lower flange portion 1c which can be most likely to be caught.

Further, when the spraying of the lubricant starts, the lubricant is sprayed from the nozzle 34 while the anti-vibration bush 1 passes through the exhaust hole 62. For that reason, in the embodiment, the lubricant which is sprayed by the exhaust operation of the exhaust pump 61 passes through a gap between the anti-vibration bush 1 and the exhaust hole 62 and flows to the exhaust duct 60 so that the lubricant is easily coated onto the anti-vibration bush 1.

In the embodiment, since the strain relaxing step of stopping the anti-vibration bush 1 for a predetermined time while regulating the movement of the anti-vibration bush 1 is performed between the press-inserting step of moving the anti-vibration bush 1 downward to be press-inserted into the attachment hole 3 of the press-insertion object 2 and the returning step of moving the anti-vibration bush 1 upward to the attachment position, it is possible to relax a strain generated in the rubber elastic body 1b of the anti-vibration bush 1 in the press-inserting step and to attach the anti-vibration bush 1 to the attachment position. For that reason, since the anti-vibration bush 1 is not easily inclined in the attachment hole 3 after extracting the anti-vibration device obtained from the bush press-insertion device 10 by taking out the press-insertion rod 21 and the returning rod 71 from the hollow portion 1f of the anti-vibration bush 1, a defective product can be prevented from being manufactured.

In the embodiment, since the strain relaxing step is performed at the first position where the lower end 2a of the press-insertion object 2 holds the straight portion 1e of the anti-vibration bush 1 after the lower reduced diameter portion 1d of the anti-vibration bush 1 protrudes downward from the press-insertion object 2, it is possible to relax a strain generated in the rubber elastic body 1b of the anti-vibration bush 1 due to the press-inserting step in short time and to shorten the anti-vibration device manufacturing cycle time.

While the embodiment of the invention has been described, the embodiment is merely an example and does not limit the scope of claims. The novel embodiment can be implemented in various modes and various omissions, replacements, and modifications can be made without departing from the spirit of the invention.

What is claimed is:

1. An anti-vibration device manufacturing method of press-inserting an anti-vibration bush having a rubber elastic body formed on an outer periphery of a cylindrical body into an attachment hole formed in a press-insertion object, the anti-vibration device manufacturing method comprising:
    a press-inserting step of moving the anti-vibration bush in a first direction from an initial position separated from the press-insertion object to be press-inserted into the attachment hole;
    a returning step of moving the anti-vibration bush press-inserted into the attachment hole in a second direction opposite to the first direction; and
    a strain relaxing step of relaxing a strain of the rubber elastic body by stopping the anti-vibration bush while regulating the movement of the anti-vibration bush between the press-inserting step and the returning step.

2. The anti-vibration device manufacturing method according to claim 1,
wherein in the anti-vibration bush, an outer peripheral surface of the rubber elastic body is provided with a straight portion parallel to the first direction and a reduced diameter portion provided at a front side of the straight portion in the first direction to have a diameter smaller than the straight portion, and
wherein in the press-inserting step, the reduced diameter portion protrudes in the first direction from the press-insertion object and the anti-vibration bush moves in the first direction to a position where a front end of the press-insertion object in the first direction holds the straight portion.

3. The anti-vibration device manufacturing method according to claim 1,
wherein a coating step of coating a lubricant onto the rubber elastic body is performed before the press-inserting step.

4. The anti-vibration device manufacturing method according to claim 3,
wherein in the coating step, a lubricant is sprayed to the rubber elastic body of the anti-vibration bush moving from the initial position in the first direction inside a casing provided between the initial position and the press-insertion object.

5. The anti-vibration device manufacturing method according to claim 4,
wherein the lubricant spraying direction is inclined to approach a tangential direction of the anti-vibration bush with respect to a radial direction of the anti-vibration bush.

6. The anti-vibration device manufacturing method according to claim 4,
wherein the lubricant spraying direction is inclined in the second direction with respect to a plane orthogonal to a movement direction of the anti-vibration bush.

7. The anti-vibration device manufacturing method according to claim 2,
wherein a coating step of coating a lubricant onto the rubber elastic body is performed before the press-inserting step.

8. The anti-vibration device manufacturing method according to claim 7,
wherein in the coating step, a lubricant is sprayed to the rubber elastic body of the anti-vibration bush moving from the initial position in the first direction inside a casing provided between the initial position and the press-insertion object.

9. The anti-vibration device manufacturing method according to claim 8,
wherein the lubricant spraying direction is inclined to approach a tangential direction of the anti-vibration bush with respect to a radial direction of the anti-vibration bush.

10. The anti-vibration device manufacturing method according to claim 8,
wherein the lubricant spraying direction is inclined in the second direction with respect to a plane orthogonal to a movement direction of the anti-vibration bush.

* * * * *